May 29, 1973     D. TURNER     3,736,152
METHOD OF BUTTERING CORN EARS
Original Filed Feb. 16, 1970     2 Sheets-Sheet 1
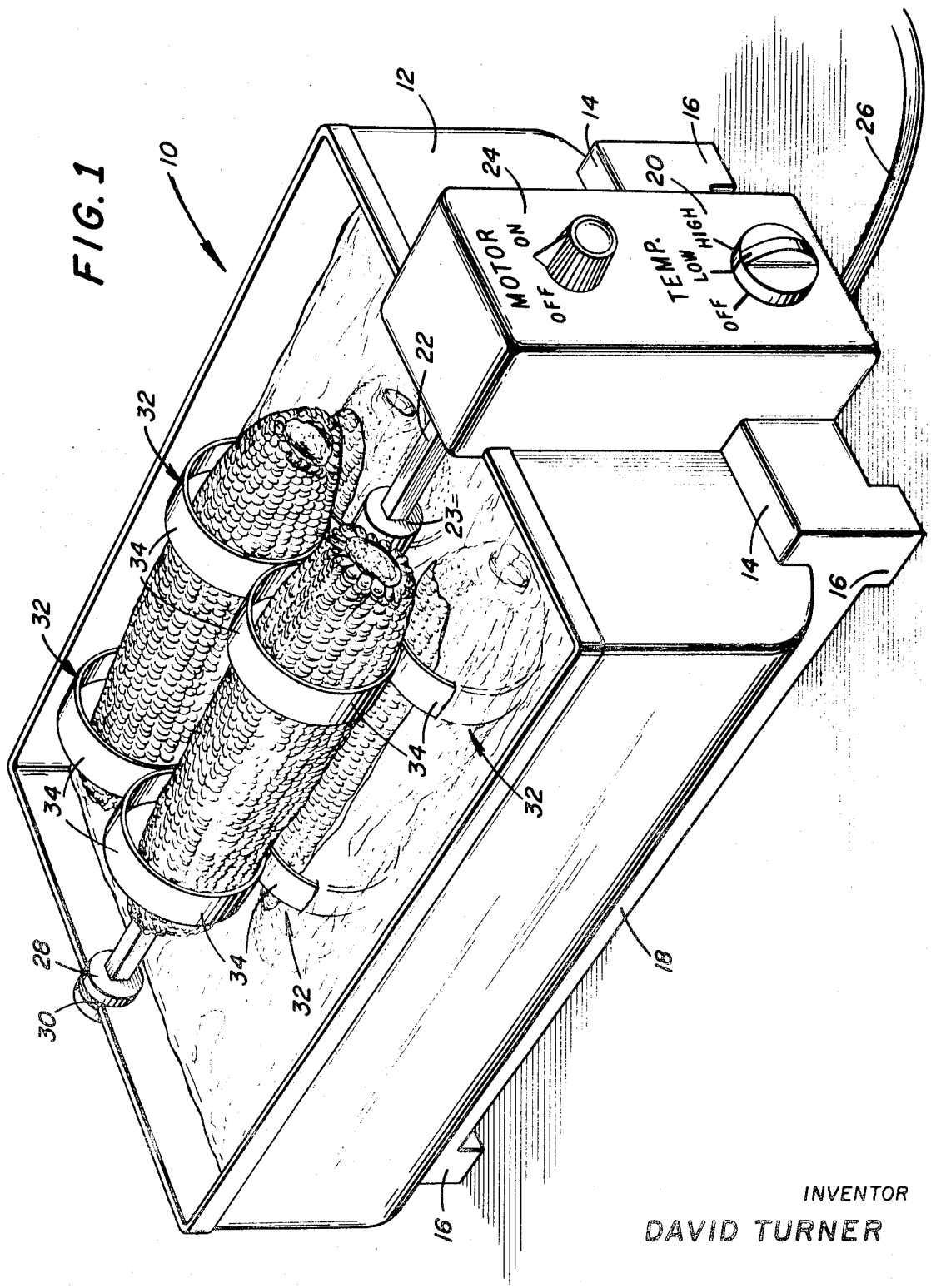
INVENTOR
DAVID TURNER May 29, 1973     D. TURNER     3,736,152
METHOD OF BUTTERING CORN EARS
Original Filed Feb. 16, 1970     2 Sheets-Sheet 2
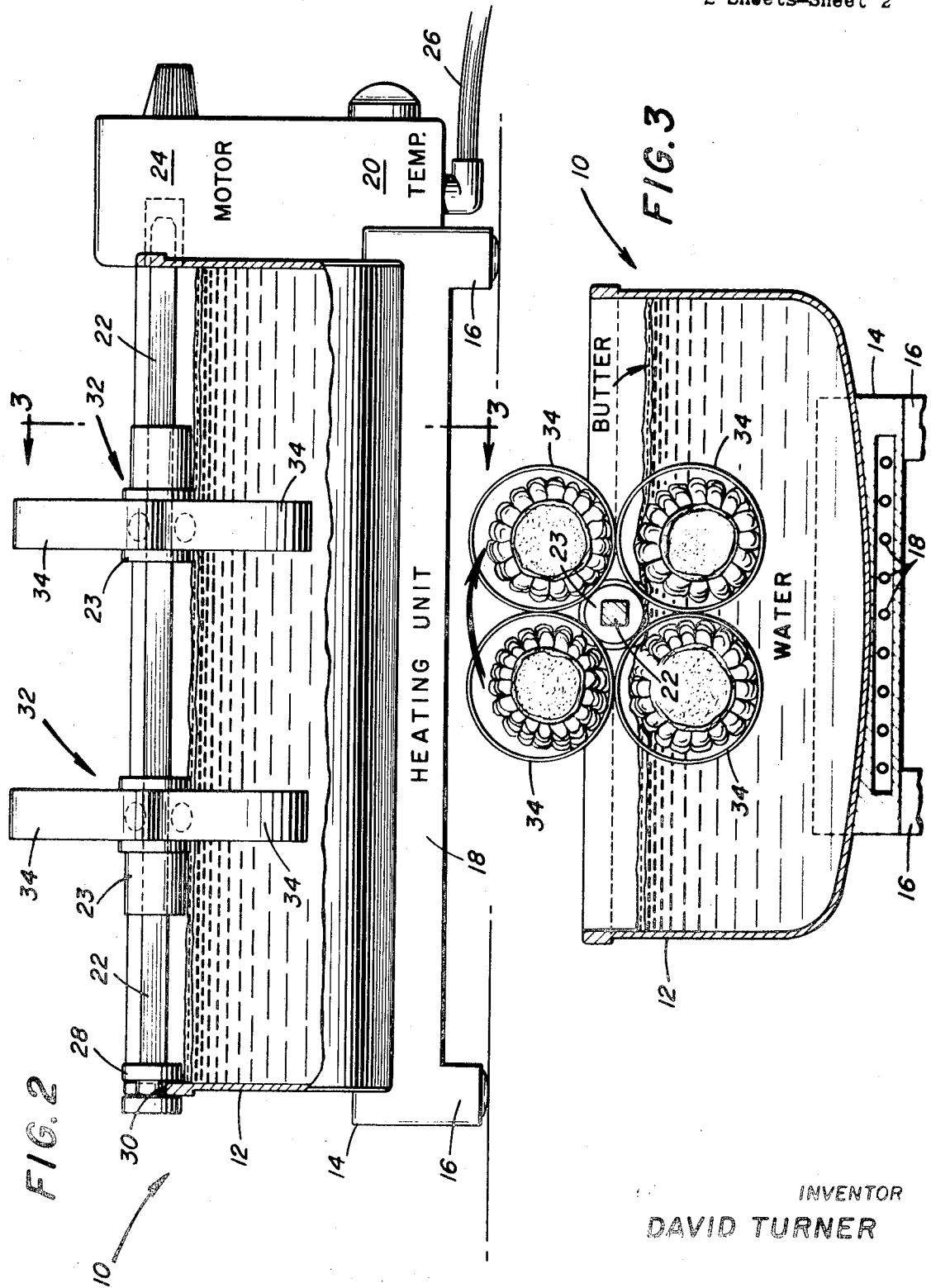
INVENTOR
DAVID TURNER 3,736,152
METHOD OF BUTTERING CORN EARS
David Turner, 410 NE. 22nd St.,
Fort Lauderdale, Fla. 33305
Continuation of application Ser. No. 11,593, Feb. 16,
1970. This application Mar. 13, 1972, Ser. No. 234,356
Int. Cl. A23l 1/00
U.S. Cl. 99—100 R    1 Claim

ABSTRACT OF THE DISCLOSURE

A method of buttering corn ears wherein a container is provided having heated water with melted butter floating on the surface thereof. The corn ears are inserted in each of a plurality of pairs of ring supports mounted on a rotatable shaft disposed across the top of the container. The shaft is then rotated whereby the corn ears are successively immersed in and withdrawn from the fluid butter and each corn ear is caused to rotate about its own axis while being passed through the fluid butter.

---

This is a continuation of application Ser. No. 11,593, filed Feb. 16, 1970, and now abandoned.

The present invention relates to improvements in buttering methods and devices for ears of corn and is concerned, more particularly, with an electric powered device for rotating ears of corn into and out of a bath of molten butter to pick up an even coating of butter and present the same ready for serving.

Heretofore, it has generally been the custom manually to apply butter either in solid or fluid form to ears of corn which results in an uneven coating and often the lack of a coating in certain areas. The present invention avoids such disadvantages and provides for applying a continuous coating of butter uniformly throughout the surface area of the corn kernels. Further, the thickness or quantity of the coating can be selectively controlled as desired depending upon the number of times or the manner in which the corn ear is passed through the bath of molten butter.

In its specific aspects, the invention provides for an elongated container for water and butter or the like, an elongated electrical heating unit at the bottom of the container for heating the contents and causing the melted fluid butter to float on the surface of the water, an elongated shaft including a plurality of radially extending corn ear holding means rotatably mounted centrally of the container so as continuously to immerse the corn ears in the fluid to pick up a coating of butter and elevate the same for removal from the holding means for service and electric motor means for rotating the shaft.

Other objects and advantages will be apparent from the following detailed description taken in conjunction with the accompanying drawings wherein a preferred embodiment of the principles of the invention has been selected for exemplification.

In the drawings:

FIG. 1 is a perspective view of a corn ear buttering electrical appliance constructed in accordance with the invention;

FIG. 2 is a side view partly broken away of FIG. 1; and

FIG. 3 is a sectional view taken on the line 3—3 of FIG. 2 and looking in the direction of the arrows.

Referring more particularly to the drawings, wherein like numerals refer to like parts, the device is indicated in its entirety by the numeral 10.

An elongated container 12, preferably having a rounded bottom for easy cleaning, is adapted to hold the water and butter or the like fluid contents. Attached to the bottom of the container 12 is a base 14 having supporting feet or the like 16 and having an elongated electrical heating unit 18 for heating the fluid contents so that the melted butter floats on the surface of the water as indicated in FIG. 3. A conventional temperature regulator 20 for the heating unit 18 is mounted at one outer end of the container 12.

An elongated shaft 22 is mounted centrally of the container 12, preferably slightly above the level of the fluid therein, and is adapted for rotation when its squared free end is inserted in the driving means of electric motor 24 mounted at the outer end of container adjacent to the regulator 20. A conduit for connecting the regulator 20 and motor 24 to a source of electric power is indicated at 26.

The opposed or outer end of the shaft 22 terminates in an annularly grooved bearing element 28 and is rotatably supported by a recessed bearing seat 30 provided in the outer end wall of container 12. To remove the shaft 22 and any parts carried thereby for cleaning or any other purpose, it is merely necessary to elevate the bearing element 28 above the seat and withdraw the shaft from its mated driving connection with the motor 24.

For supporting the corn ears for rotation with the shaft 22 into and out of the fluid bath in container 12, a plurality of spaced corn ear holding means, indicated in their entireties at 32, are carried by and extend radially outwardly of the shaft 22. Such corn ear holding means preferably are in the form of axially arranged pairs of rings 34 through which a corn ear is inserted and held in horizontal rotatable position.

As shown in FIGS. 1 and 3, the corn ears may be loosely held within opposed rings 34 to facilitate easy removal of the ears when buttered to taste. Any tendency of the ears to rotate within the rings is immaterial so long as the horizontal positioning prevents any substantial axial movement. However, any additional clamping or positioning elements may be provided if desired or also any other form of corn ear holding means provided sufficient areas of the kernel surface are exposed to the butter coating.

To facilitate attachment of the ring elements 34 or other corn ear holding means for rotation with the shaft 22, collar means 23 may be keyed to the shaft 22 and the corn ear holding means attached in any suitable manner to the collar means.

The operation of the present device is believed to be readily apparent. When water is placed in the container 12, butter in chunks or solid blocks is added and when the heating element 18 is energized to heat the water, the butter is melted to form a fluid surface layer as indicated in FIG. 3. The shaft 22 carrying its corn ear holding means 32 is operatively positioned with its squared drive end in engagement with the driving connection of motor 24, as shown in FIGS. 1 and 2. When the motor is energized the corn ears are rotated continuously and successively through the bath picking up the butter coating upon each rotation. When the corn ears are buttered as desired, the motor 24 is stopped and one or more of the elevated ears are axially removed from its holder for serving. To remove the shaft and holders for cleaning the bearing end 28 is lifted sufficiently to clear the recessed seat 30 and the shaft is withdrawn axially from the motor drive means. Of course, after cleaning, the steps are reversed for repeat operation of the apparatus. As an added advantage, when the apparatus is deactivated, the remaining butter congeals and may be readily recovered for reuse.

It is to be understood that the present invention is not confined to the particular construction and arrangement of parts herein illustrated and described but embraces all such modifications thereof as may come within the scope of the invention.

I claim:
1. The method of buttering ears of corn which comprises:
providing in an open top, elongated container, a body of water and butter;
heating said body to melt the butter and cause the fluid butter to float on the surface of the water;
loosely inserting an ear of corn in each of a plurality of pairs of ring support means which extend radially from and are located circumferentially about a rotatable shaft disposed across the open top of said container and;
rotatable shaft disposed across the open top of said of corn are successively immersed in and withdrawn from the fluid butter and each loosely supported ear of corn is caused to rotate about its own axis while being passed through said fluid butter.

References Cited

UNITED STATES PATENTS

| | | | |
|---|---|---|---|
| 381,638 | 4/1888 | Palmer | 134—159 X |
| 670,344 | 3/1901 | Jena | 118—426 |
| 2,127,595 | 8/1938 | Heden | 118—402 |
| 2,752,250 | 6/1956 | Kasser | 118—30 X |
| 2,818,044 | 12/1957 | Booty, Jr. et al. | 118—426 |
| 2,872,894 | 2/1959 | Isreel | 118—426 X |
| 2,903,996 | 9/1959 | Schwes | 118—30 X |
| 3,105,776 | 10/1963 | Weyhmueller | 118—426 X |
| 3,308,269 | 3/1967 | Stocker | 118—26 UX |
| 3,435,835 | 4/1969 | Hobbs | 134—159 X |

MORRIS KAPLAN, Primary Examiner

U.S. Cl. X.R.

118—30